United States Patent [19]
Suzuki et al.

[11] Patent Number: 5,222,007
[45] Date of Patent: Jun. 22, 1993

[54] AUTOMATIC EJECTION SYSTEM OF A CAR STEREO HAVING A DETACHABLE GRILLE

[75] Inventors: Takashi Suzuki; Shigeru Munetomo; Terumasa Shimizu, all of Saitama, Japan

[73] Assignee: Pioneer Electronic Corporation, Tokyo, Japan

[21] Appl. No.: 797,857

[22] Filed: Nov. 26, 1991

[30] Foreign Application Priority Data

May 16, 1991 [JP] Japan ............................... 3-44255[U]

[51] Int. Cl.⁵ .............................................. G11B 33/00
[52] U.S. Cl. ...................................... 360/137; 360/71; 455/349
[58] Field of Search .............. 360/71, 137, 99.02, 360/99.06; 369/75.1; 455/345, 346, 348, 349, 351

[56] References Cited

U.S. PATENT DOCUMENTS

| | | | |
|---|---|---|---|
| 4,623,992 | 11/1986 | Kurosaki et al. | 360/137 |
| 4,940,414 | 7/1990 | Lee | 455/349 |
| 5,010,437 | 4/1991 | Utsugi et al. | 360/137 |

Primary Examiner—Aristotelis Psitos
Assistant Examiner—P. W. Huber
Attorney, Agent, or Firm—Nikaido, Marmelstein, Murray & Oram

[57] ABSTRACT

An automatic ejection system includes a loading device. The automatic ejection system has a grille detector for detecting the removing of a grille from a car stereo and for producing a detachment signal, a tape detector for detecting existence of a tape in the car stereo and for producing a tape signal, and ejection controller responsive to the detachment signal and the tape signal for operating the loading device so as to automatically eject the tape from the car stereo.

4 Claims, 4 Drawing Sheets

AUTOMATIC EJECTION SYSTEM OF A CAR STEREO HAVING A DETACHABLE GRILLE

BACKGROUND OF THE INVENTION

The present invention relates to a car stereo provided with a detachable grille, and more particularly to an automatic ejection system for improving the prevention of theft of the car stereo.

Increase in use of sophisticated car stereo in recent years has caused increase in the theft of the stereo. In order to prevent the theft of the stereo, there has been proposed measures for the stereo. In accordance with one of the measures, a grille having a plurality of push buttons for the stereo is provided to be separated from the body of the stereo, and is detachably attached to the front portion of the stereo.

FIG. 4 shows the above described prior art. The car stereo comprises a car stereo body 21 and a detachable grille 22 attached to the body 21. The body 21 has a recessed panel 23 mounted at the front thereof. At an upper central portion of the panel 23 is formed a cassette opening 24 having a cover 25, which coincides with a cassette opening 26 of the grille 22.

A series of terminals 28 connected to terminals (not shown) provided on the back of the grille 22 is disposed at the right-hand side of the panel 23. Numeral 29 designates a cassette tape. The grille 22 has various push buttons 27.

In order to attach the grille 22 on the body 21, the grille 22 is positioned to the recess of the panel 23. The grille 22 is then pushed to close the panel 23. Thus, the grille 22 fits in the recess of the panel 23, and is locked by a push-push mechanism provided in the body 21. If the grille 22 is forcibly depressed at the side thereof, the lock mechanism is released by the push-push mechanism, so that the grille 22 can be removed from the body 21.

In order to playback the cassette tape 29, the tape 29 is inserted into the body 21 through the opening 24 of the panel 23 and the opening 26 of the grille 22. The tape 29 is loaded in the playback position by a loading device provided in the body 21. Thus, the playback of the tape starts.

When the grille 22 is taken out, the stereo body 21 loses the appearance as a car stereo. Hence, if the driver takes the grille 22 with him when leaving the vehicle, the theft of the car stereo is prevented.

However, in the conventional car stereo, when the grille 22 is removed from the body 21, the cassette tape 29 remains in the body 21, and the cover 25 of the opening 24 is slightly opened. Thus, a part of the tape 29 can be seen from the opening as shown in FIG. 4. Accordingly, the existence of the car stereo is suggested, prevention of theft of the car stereo is not ensured.

Furthermore, if the cover 25 is opened, dust may enter the body, causing the trouble of the car stereo.

If the grille 22 is detached without taking out the tape from the body 21, the grille 22 is attached to the body 21 again and an ejection button provided on the grille 22 must be operated. This is very troublesome operation.

SUMMARY OF THE INVENTION

An object of the present invention is to provide a system which detects a cassette tape in the car stereo body and operates to automatically eject the tape with a simple construction, thereby preventing theft of the car stereo and eliminating the trouble of the car stereo.

To this end, the automatic ejection system of the car stereo according to the present invention has a car stereo body, a detachable grille, and automatic ejection means including a loading device. The automatic ejection means comprises grille detector means for detecting the removing of the grille and producing a detachment signal, tape detector means for detecting existence of the tape in the car stereo and producing a tape signal, and ejection controller means responsive to the detachment signal and the tape signal for operating the loading device so as to automatically eject the tape from the car stereo body.

The other objects and features of this invention will become understood from the following description with reference to the accompanying drawings.

Figure 1:
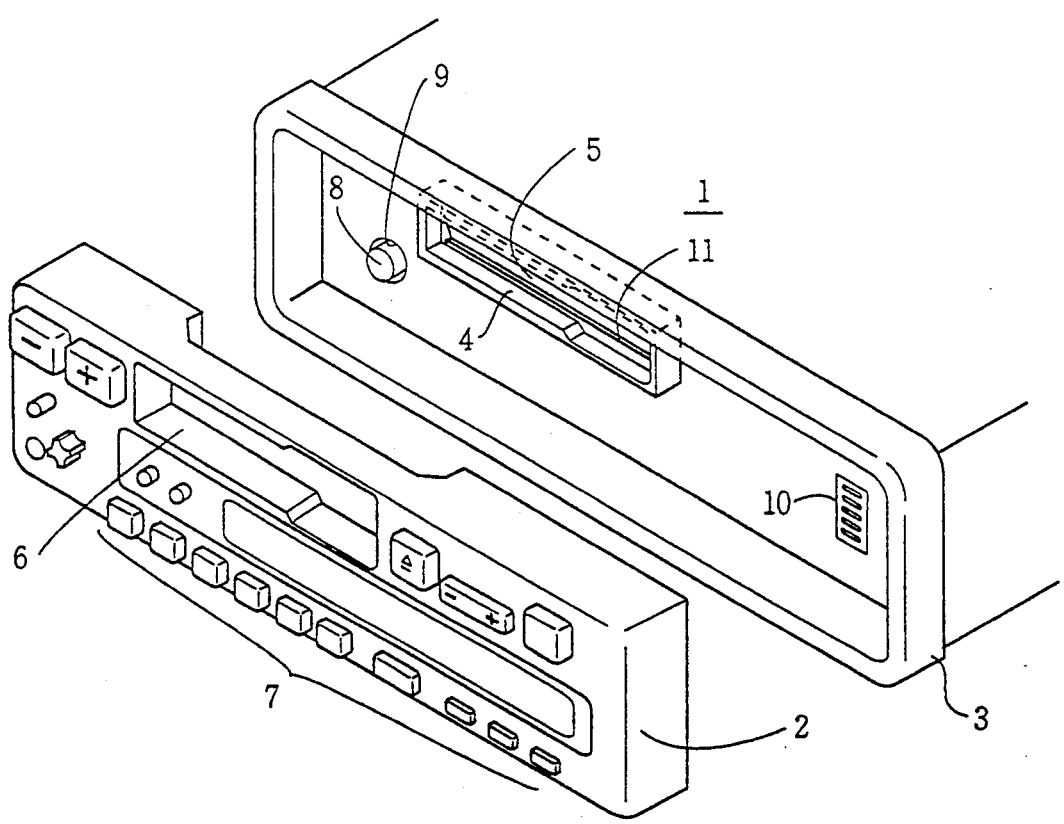
FIG. 1 is a perspective view of a car stereo having a detachable grille to which the present invention is applied, with the grille shown in a detached state.

DETAILED DESCRIPTION OF THE PREFERRED EMBODIMENT referring to FIG. 1, a car stereo as one of electric equipments to which the present invention is applied comprises a car stereo body 1 and a grille 2.

A front panel 3 having a recess is fixed on the outer periphery of the front portion of the car stereo body 1. The recess is so dimensioned that the grille 2 snugly fits therein. At an upper central portion of the panel 3 is formed a cassette opening 4 having a cover 5, which coincides with a cassette opening 6 of the grille 2.

The panel 3 has a hole 9 formed at the left-hand side thereof. A grille detecting button 8 is projected from the hole 9 for detecting the attachment and detachment of the grille 2.

Figure 2A:
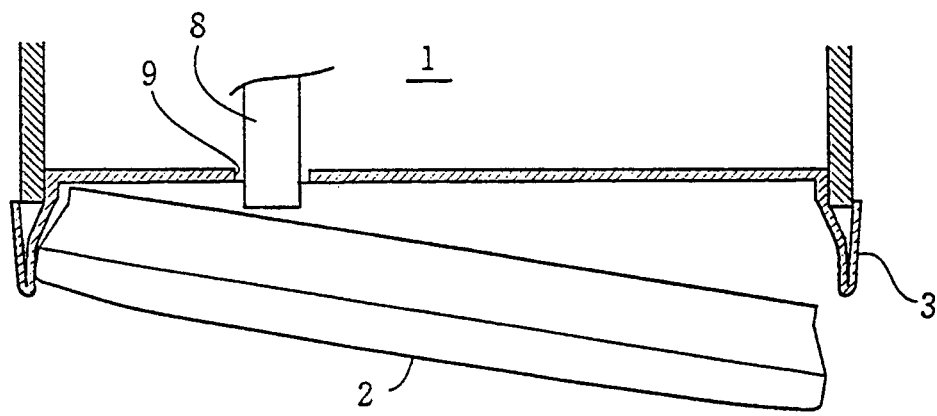
FIGS. 2a and 2b are sectional views of a part of the car stereo describing the attaching and detaching operations of the grille.

As shown in FIG. 2a, the detecting button 8 is urged by a spring (not shown) to be projected from the panel 3.

Figure 2B:
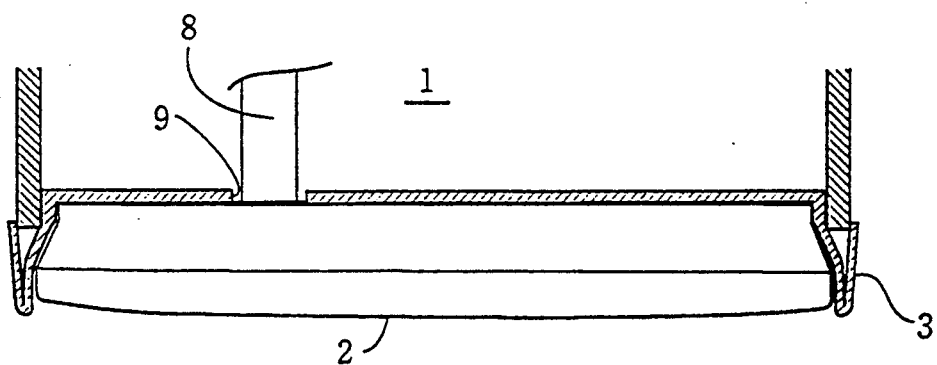

As shown in FIG. 2b, when the grille 2 is attached to the panel 3, the back of the grille 2 engages with the button 8 to depress the button in the car stereo body 1.

A series of terminals 10 connected to terminals (not shown) provided on the back of the grille 2 is disposed at the right-hand side of the panel 3. Numeral 11 designates a cassette tape.

On the face of the grille 2 are provided various push buttons 7 and knobs for operating the car stereo, such as volume control button, ejection button, mode select button, source select button, fader knob, loudness button, preset buttons, frequency select button, and function buttons.

Figure 3:
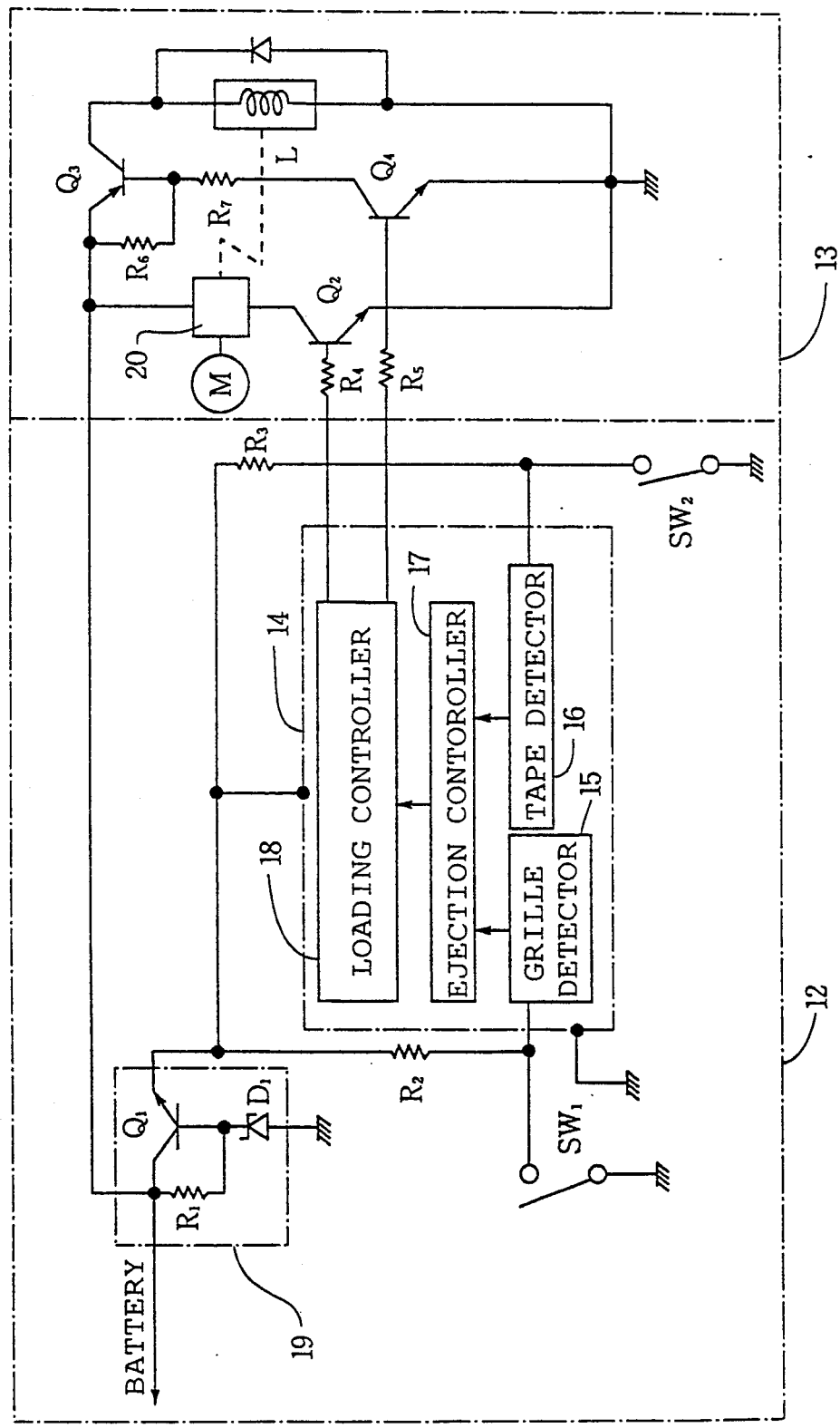
FIG. 3 shows a circuit for an automatic ejection system.
Figure 4:
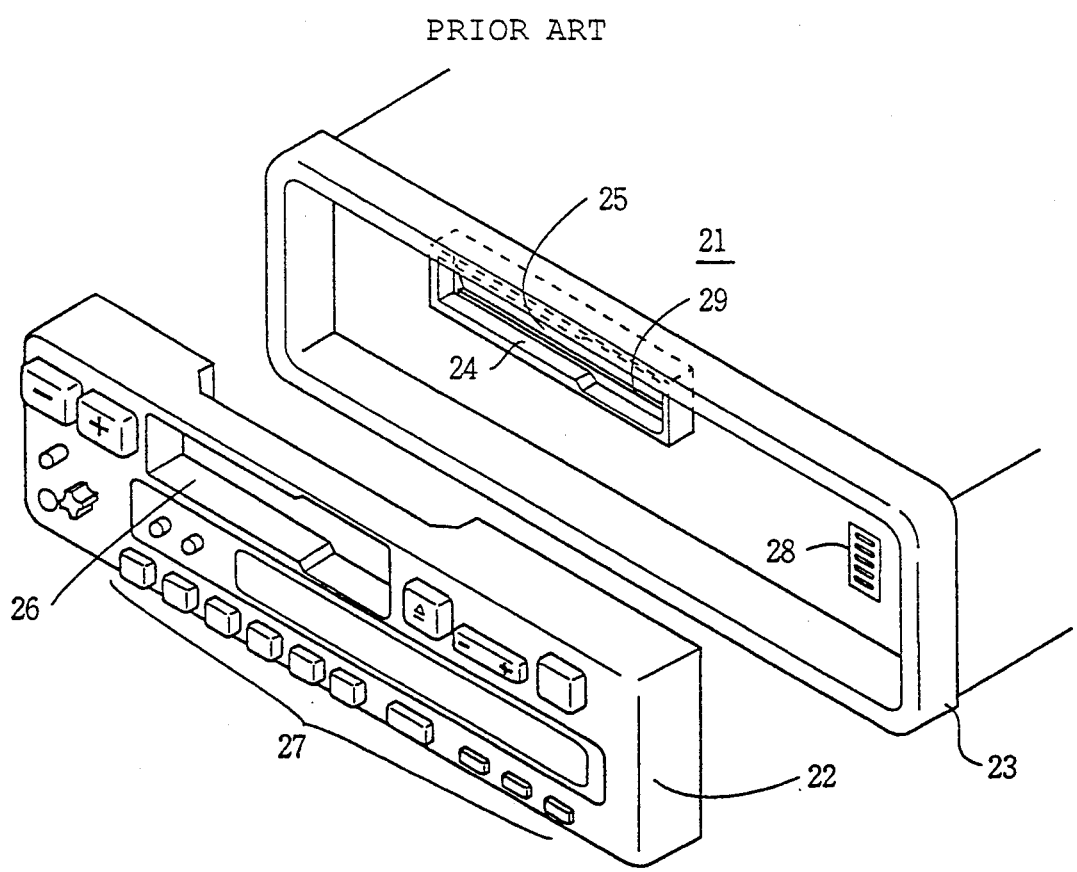
FIG. 4 is a perspective view of a conventional car stereo having a grille, shown in a detached state.

Referring to FIG. 3, the automatic ejection system comprises a control section 12 having a control unit 14 and a constant voltage circuit 19, and a drive section 13.

The constant voltage circuit 19 of the control section 12 has a transistor Q1, a constant voltage diode D1 and a gain determining resistor R1. A collector of the transistor Q1 is connected to a battery, a base thereof is connected to the ground through the diode D1. and an emitter thereof is connected to the control unit 14.

The control unit 14 comprises a grille detector 15, a switch SW1 connected to the grille detector 15, a tape detector 16, a switch SW2 connected to the tape detector 16, an ejection controller 17 for automatically controlling an ejection of the tape 11, and a loading controller 18 for controlling a loading device which operates to load the tape 11 from the set position to the playback position, and vice versa.

The output of the constant voltage circuit 19 is further connected to the grille detector 15 and the switch SW1 through a resistor R2, and the tape detector 16 and the switch SW2 through a resistor R3. The switch SW1 is operatively connected to the button 8 and closed when the grille 2 is mounted on the body 1. The switch SW2 is closed when the tape 11 is mounted in the body 1 through the opening 6 to playback the tape. The detectors 15 and 16 detect on/off state of the respective switches SW1 and SW2 in accordance with levels of potential at the resistors R2 and R3, respectively. The output signals of the detectors are applied to the ejection controller 17.

The ejection controller 17 determines an automatic ejection operation of the tape 11 in accordance with the outputs of the detectors. When the switch SW 1 is opened and the switch SW2 is closed, the ejection controller 17 determines that the tape 11 is still in the body 1 in spite of the removing of the grille from the body 1. The controller 17 produces a control signal which is applied to the loading controller 18. The loading controller 18 produces an output signal for automatically ejecting the tape 11.

The drive section 13 comprises a transistor Q2 a base of which is connected to the loading controller 18 of the control section 14 through a resistor R4, and a transistor Q4 a base of which is also connected to the loading controller 18 through a resistor R5. A collector of the transistor Q2 is connected to a switching circuit 20 for operating a motor M of the loading device. The switching circuit 20 is further connected to the battery. A collector of the transistor Q4 is connected to a base of a transistor Q3 through a resistor R7. A collector of the transistor Q3 is connected to a solenoid L and an emitter thereof is connected to the battery. Emitters of the transistors Q2 and Q4 are connected to the ground. The solenoid L is operatively connected to the switching circuit 20 for reversely rotating the motor M.

Describing an ordinary playback operation, the loading controller 18 is operatively connected to a playback switch and an ejection switch (not shown).

When the tape 11 is inserted into the car stereo body 1 through the opening 6 of the grille 2 and the opening 4, the playback switch is turned on. The loading controller 18 produces a signal for operating the motor M of the loading device. Thus, the tape 11 is loaded from the set position to the playback position by the loading device. Thus, the playback starts. At that time, the switch SW2 is closed.

In order to stop the tape, the ejection button on the grille 2 is pushed. The ejection switch is operated and an ejection signal is applied to the loading controller 18. The loading controller operates to stop the playback of the tape and to reversely drive the motor M. Thus, the tape is unloaded to the set position and ejected from the opening 6.

Describing the automatic ejection operation of the system, when the tape 11 is reproduced. since the grille 2 is attached to the body 3, the switches SW1 and SW2 are closed. Thus, the ejection controller 17 is not operated.

If the power for the accessories are turned off by operating an ignition switch, the playback of the tape stops. When the grille 2 is detached from the body 1, the switch SW1 is opened. The grille detector 15 detects the removing of the grille in accordance with the change of the potential, and produces a detected signal which is applied to the ejection controller 17. In this state, the ejection controller 17 is further applied with a detected signal from the tape detector 16 representing the closing state of the switch SW2. Thus, the ejection controller 17 produces an output signal that the grille 2 is removed and the tape 11 is still mounted in the body 1. In response to the output signal, the loading controller 18 produces an output signal to turn on the transistors Q2 and Q4. Thus, switching circuit 20 is turned on and the power of the battery is fed to the motor M through the circuit for driving the motor. Further, the transistor Q3 is turned on through the transistor Q4. The power is fed to the solenoid L through the transistor Q3 to energize the solenoid The motor M is reversely operated by the solenoid L through the switching circuit 20. The loading device is operated by the motor M through a transmitting device (not shown). Thus, the tape 11 in the body 1 is automatically ejected from the body 1 through the opening 4 of the panel 3.

In accordance with the present invention, when the grille is detached from the car stereo body, the tape remaining in the body is automatically ejected from the body. Thus, it is effective to prevent the theft of the car stereo. Furthermore, the cover of the cassette opening is also automatically closed, thereby shutting out dust.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An automatic ejection system of a car stereo having a detachable grille comprising:
   first detector means for detecting detaching of the grille from a body of the car stereo and for producing a detachment signal;
   second detector means for detecting existence of a tape in the body of the car stereo and for producing a tape signal;
   ejecting means responsive to the detachment signal and the tape signal for ejecting the tape from the body.

2. A system according to claim 1 wherein first detector means is a switch operated by the detaching of the grille.

3. A system according to claim 1 wherein the second detector means is a switch operated by the tape mounted in the body.

4. A system according to claim 1 wherein ejecting means includes a motor for ejecting the tape.

* * * * *